US009581247B2

(12) United States Patent
Takigahira et al.

(10) Patent No.: US 9,581,247 B2
(45) Date of Patent: Feb. 28, 2017

(54) SHAFT SEAL APPARATUS

(75) Inventors: Yoshiaki Takigahira, Tokyo (JP); Yoji Oshii, Tokyo (JP); Atsushi Kaneko, Tokyo (JP); Tetsuya Sato, Tokyo (JP)

(73) Assignees: EAGLE BURGMANN JAPAN CO., LTD., Tokyo (JP); EAGLE INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 13/983,331

(22) PCT Filed: May 18, 2012

(86) PCT No.: PCT/JP2012/062815
§ 371 (c)(1),
(2), (4) Date: Aug. 2, 2013

(87) PCT Pub. No.: WO2013/001935
PCT Pub. Date: Jan. 3, 2013

(65) Prior Publication Data
US 2014/0232070 A1 Aug. 21, 2014

(30) Foreign Application Priority Data
Jun. 30, 2011 (JP) .................................. 2011-146217

(51) Int. Cl.
F16J 15/34 (2006.01)
F16J 15/40 (2006.01)

(52) U.S. Cl.
CPC ....... *F16J 15/3404* (2013.01); *F16J 15/3484* (2013.01); *F16J 15/406* (2013.01)

(58) Field of Classification Search
USPC .......................... 277/367, 358, 369, 370, 408
See application file for complete search history.

(56) References Cited

U.S. PATENT DOCUMENTS 3,097,854 A 7/1963 Kaiser
3,612,548 A * 10/1971 Tracy ............................ 277/385
(Continued)

FOREIGN PATENT DOCUMENTS

DE 19834012 A1 5/1999
FR 1260957 A 5/1961
(Continued)

OTHER PUBLICATIONS

JP corresponding application office action dated Sep. 8, 2015.
Extended EP Search Report dated May 15, 2015.

*Primary Examiner* — Kristina Fulton
*Assistant Examiner* — Eugene G Byrd
(74) *Attorney, Agent, or Firm* — Harness, Dickey & Pierce, P.L.C.

(57) ABSTRACT

A pumping ring 46 producing an axial flow of sealed flow is secured to a rotary shaft 6 at an axial position different from a rotary ring 56 so that the sealed fluid positioned in the sealed space 33 flows along the axial direction of the rotary shaft 6. A discharge hole 14 is formed on an inner circumferential surface of a seal cover 8 positioned in the downstream side of the axial flow of the sealed fluid resulting from a rotation of the pumping ring 46. An inflow hole 15 is formed in the upstream side of the axial flow of the sealed fluid resulting from the rotation of the pumping ring 46, so that the sealed fluid discharged from the discharge hole 14 returns to the inside of the sealed space from the inflow hole 15. On the inner circumferential surface of the seal cover 8 provided with the discharge hole 14, a baffle member 18 is provided so that it protrudes radially inward in order to block the flow of the sealed fluid along the rotating direction of a retainer 52 and orient the sealed fluid toward the discharge hole 14.

9 Claims, 11 Drawing Sheets

(56) References Cited

U.S. PATENT DOCUMENTS

| | | | |
|---|---|---|---|
| 4,103,907 A * | 8/1978 | Inouye et al. | 277/400 |
| 4,294,454 A * | 10/1981 | Cannings | 277/366 |
| 4,361,334 A * | 11/1982 | Amorese et al. | 277/405 |
| 4,804,194 A | 2/1989 | Hufford et al. | |
| 5,076,589 A | 12/1991 | Marsi | |
| 5,351,972 A * | 10/1994 | Anderberg | 277/362 |
| 5,375,853 A * | 12/1994 | Wasser et al. | 277/366 |
| 5,605,436 A * | 2/1997 | Pedersen | 415/170.1 |
| 5,713,576 A * | 2/1998 | Wasser et al. | 277/304 |
| 6,250,876 B1 * | 6/2001 | Høgholt | 415/17 |
| 6,402,462 B1 | 6/2002 | Dipl-Ing | |
| 7,014,192 B2 * | 3/2006 | Takahashi et al. | 277/361 |
| 8,033,549 B2 * | 10/2011 | Huang | 277/366 |
| 2002/0109302 A1 * | 8/2002 | Muraki | 277/408 |
| 2003/0122313 A1 * | 7/2003 | Takahashi | 277/358 |
| 2003/0178782 A1 * | 9/2003 | Takahashi | 277/408 |
| 2005/0035554 A1 * | 2/2005 | Roberts et al. | 277/358 |
| 2008/0111314 A1 * | 5/2008 | Huang | 277/354 |
| 2009/0127793 A1 * | 5/2009 | Ferris et al. | 277/361 |
| 2009/0212503 A1 | 8/2009 | Huang | |

FOREIGN PATENT DOCUMENTS

| | | |
|---|---|---|
| FR | 1372211 A | 9/1964 |
| GB | 2277561 A | 11/1994 |
| JP | 49-113062 | 1/1973 |
| JP | 59-068866 | 5/1984 |
| JP | 05-45834 | 11/1993 |
| JP | 2003-074712 | 3/2003 |

\* cited by examiner

SHAFT SEAL APPARATUS

CROSS-REFERENCE TO RELATED APPLICATIONS

This application is a 371 U.S. National Stage of International Application No. PCT/JP2012/062815, filed May 18, 2012, which claims priority to Japanese Patent Application No. 2011-146217, filed Jun. 30, 2011. The disclosures of the above applications are entirely incorporated by reference herein.

FIELD OF THE INVENTION

The present invention relates to a shaft seal apparatus. Specifically, it relates to the shaft seal apparatus that enables effectively to cool a rotary ring and a stationary ring which are mutually sliding.

DESCRIPTION OF THE RELATED ART

For instance, for a shaft seal composed of mechanical seal shown in the following Patent Literature 1, a partial impeller which pumps a fluid in order to self-circulate is attached to a rotary shaft. Further, on the inner circumferential surface of a stuffing box which is positioned over the rotary shaft, an inflow hole and a discharge hole are provided at a different position along the axial direction. Therefore, the shaft seal is configured to produce a flow in the axial direction from the inflow hole to the discharge hole resulting from the rotation of the rotary shaft so that the mechanical seal composed of a rotary ring and a stationary ring is cooled.

However, for the conventional shaft seal apparatus, a thrust for discharging the sealed fluid from the discharge hole is not sufficient enough to discharge the fluid since the thrust is caused only by pumping of the partial impeller. Therefore, a circulation of the fluid by the pumping function does not work well and it is difficult to cool effectively. Particularly, when there needs to form a discharge hole extending in a radial direction instead of a discharge hole extending in an axial direction, discharging power is not sufficient. Therefore, if a cooling heat exchanger is attached in the middle of external piping connecting a discharge hole and an inflow hole, flow resistance is increased. Therefore, there needs to provide a pump and the like additionally in the middle of external piping.

PRIOR ARTS

Patent Literature: H5-45834

SUMMARY OF THE INVENTION

Problems to be Solved by the Invention

The present invention has been made by considering the above situation, and an object of the present invention is to provide a shaft seal apparatus capable of cooling a rotary ring and a stationary ring that mutually slide by effectively circulating the sealed fluid.

Solution to Problem

In order to achieve the above object, a shaft seal apparatus according to the present invention comprises:

a stationary ring secured to a stationary member, and a rotary ring secured to a rotational body that rotates with respect to said stationary member to rotate together with said rotational body, and having a rotational sliding surface that slides on a stationary sliding surface of said stationary ring, wherein said stationary member covers over said rotational body so that a sealed space of sealed fluid sealed by sliding of said stationary sliding surface and said rotational sliding surface is formed over said rotary ring, and a pumping ring producing an axial flow of said sealed fluid is secured to said rotational body at an axial position different from said rotary ring so that said sealed fluid positioned in said sealed space flows along the axial direction of said rotational body, a discharge hole is formed on an inner circumferential surface of said stationary member positioned on the downstream side of the axial flow of said sealed fluid resulting from a rotation of said pumping ring, and a baffle member is provided so that it protrudes radially inward in order to block the flow of said sealed fluid along the rotating direction of said rotational body and orient the sealed fluid toward said discharge hole.

For the shaft seal apparatus according to the present invention, it produces an axial flow of sealed fluid by a pumping ring and orient the fluid toward a rotary ring and a stationary ring positioned on the downstream side (or upstream side) of the pumping ring in order to cool these sliding rings.

Further, a centrifugal force, that is a force directed in a radially outward direction, is exerted on the fluid in the downstream side of the pumping ring by the circumferential flow generated resulting from the rotation of the rotational body, and the sealed fluid is discharged from the discharge hole. Furthermore, by arranging a baffle member to orient the circumferential flow of the fluid toward the discharge hole, it enables to increase a flow rate discharged from the discharge hole, and also enables to improve discharge pressures from the discharge hole.

Preferably, an inflow hole is formed on the inner circumferential surface of said stationary member positioned in the upstream side of the axial flow of said sealed fluid resulting from the rotation of said pumping ring, so that the sealed fluid discharged from said discharge hole returns to the inside of said sealed space from said inflow hole.

With this configuration, there is no need to provide a pumping function in the middle of external piping from the discharge hole toward the inflow hole. A higher discharge pressure is required to flow the fluid since pressure loss is increased as the external piping gets longer. However, in the present invention, it enables to improve the discharge pressure, and it becomes possible to provide a longer piping than the conventional one if the flow rate is the same with the conventional. In line with that, it enables flexibility for the attachment and arrangement of apparatus.

Furthermore, it becomes possible to provide a cooler having a higher cooling capacity (for a cooler having a high cooling capacity, a surface area of piping is large. The more the surface area of the piping gets large, the more the pressure loss is increased), and the cooling performance is improved.

Preferably, said baffle member is arranged with a predetermined space over said rotary ring or a retainer retaining said rotary ring, and convex portions increasing the flow of said sealed fluid along the rotating direction of said rotational body is formed on the outer circumference of said rotary ring or retainer.

By mounting the baffle member over the rotary ring or the retainer with a radial space, when a whirling of the rotary shaft is caused, the baffle member does not contact with rotary ring or retainer since there is a space. Therefore, it enables to design with a large geometrical tolerance of the rotational body (axial deflection, concentricity, perpendicularity). Further, when the accuracy of the rotary shaft is largely decreased at the time of operation (for instance, effects of bearing deterioration, damages and the like), it enables to avoid contact of the baffle member with the rotary ring or retainer. Furthermore, with the radial space, the fluid can contacts the entire circumference of the rotary ring. Therefore, it enables to cool the fluid with the entire circumference.

Further, a convex portion may be provided on the outer circumferential surface of the rotary ring or the retainer to make the surface area of the rotary ring or the retainer large and also to increase the area where the fluid contacts. With this, it enables easily to cool. Further, the rotary ring and the retainer are rotating members so as to agitate the fluid with grooves, so that it enables to cause a stronger circumferential flow and also enables to increase the discharge amount of the fluid from the discharge hole.

Preferably, said discharge hole is formed on the inner circumferential surface of said stationary member positioned over said rotary ring, and said discharge hole is inclined to the inner circumferential surface of said stationary member in a direction accepting the flow of said sealed fluid along the rotating direction of said rotational body.

By inclining the discharge hole, the fluid flowing in a circumferential direction which contacts with the baffle member is easily discharged. With this, the flow rate of the fluid discharged from the discharge hole is increased and the discharge pressure is also increased. Further, the fluid flows in a circumferential direction, moving toward the radially outer side due to a circumferential flow and a centrifugal force caused by the circumferential flow. Therefore, when the discharge hole is inclined to the circumferential direction, the fluid flows toward the discharge hole, and the fluid is easily discharged.

In the present invention, the plane of the baffle member at the discharge hole side may be inclined toward the discharge hole. In that case, it allows the fluid flowing in a circumferential direction easier to flow to the discharge hole. With this, the discharge pressure increases along with the increase of the discharge flow rate. Specifically, the flow rate is increased by avoiding the decrease of the discharge pressure. Further, in the present invention, the discharge hole may be inclined to the axial direction. In that case, the discharge hole is provided towards the axial flow of the fluid, so that the fluid is easily discharged.

Preferably, said baffle member is removably mounted with respect to said stationary member. If the baffle member is removably mounted, it enables to appropriately select the baffle member according to the use conditions. Further, it enables to exchange only the baffle member when maintenance is being performed.

Further, the baffle member is removable and it enables to process only the baffle member. Therefore, it becomes possible to process more complicated shapes. Further, the baffle member can be made of different materials from seal housing and more flexible materials than the rotary ring, for instance, flexible materials such as plastics. In this case, even if the whirling of the rotary shaft is excessive, and the baffle member contact with the rotary ring, it enables to prevent damages of the rotary ring and also to avoid the loss of important function as a mechanical seal, specifically, enables to avoid the leakage of the fluid and the like.

DETAILED DESCRIPTION OF THE PREFERRED EMBODIMENTS

The following is the explanation of the present invention based on embodiments shown in figures.

First Embodiment

Figure 1:
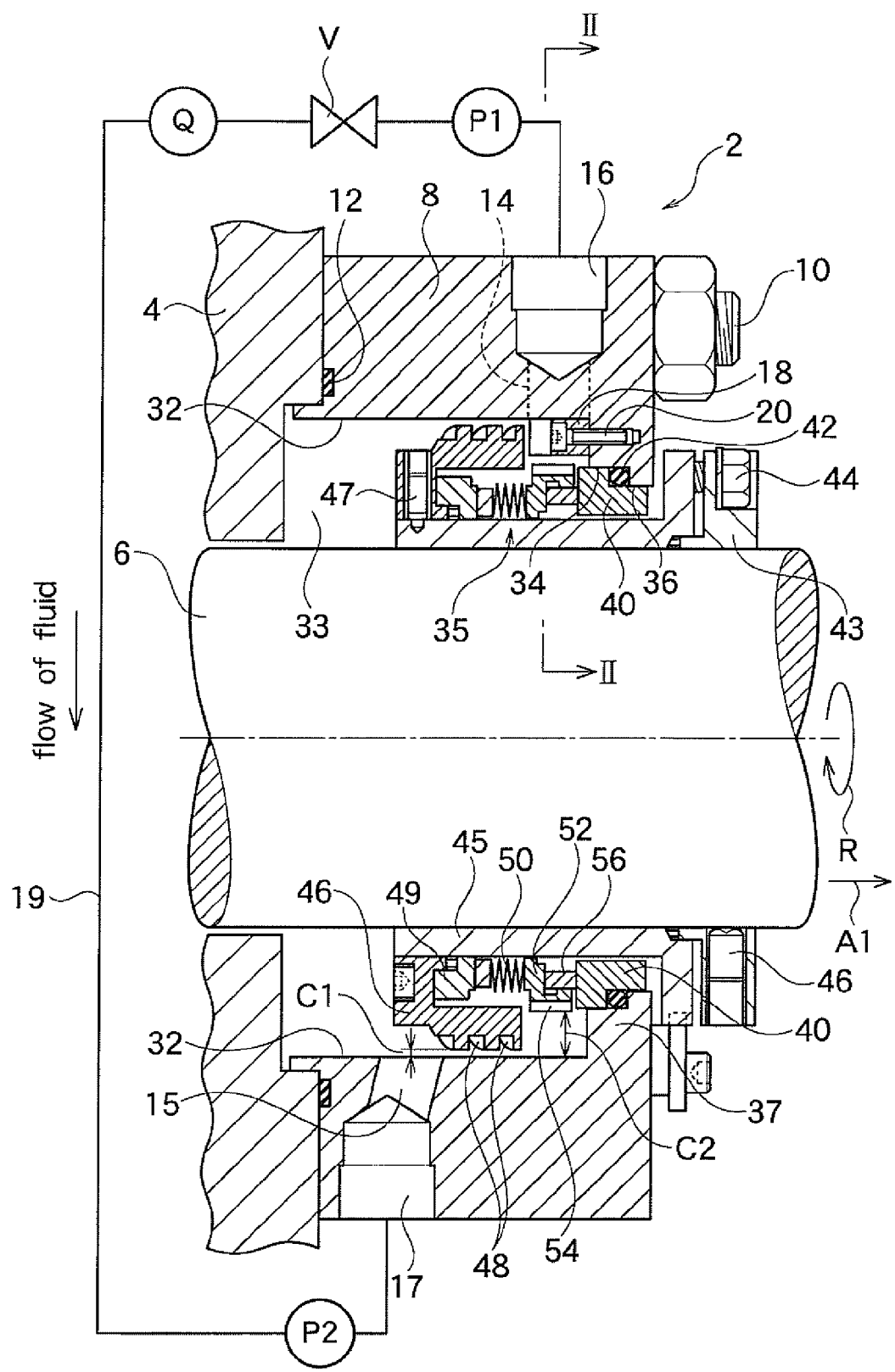
FIG. 1 is a cross sectional view of main part of a shaft seal apparatus according to one embodiment of the present invention.

As shown in FIG. 1, a shaft seal apparatus 2 according to one embodiment of the present invention intends to seal the fluid, for instance, between a casing 4 (stationary member) of a fluid machine such as a pump and a compressor, and a rotary shaft (rotational body) 6.

The rotary shaft 6 extends inside of the casing 4, and an impeller (not shown) and the like are attached to the rotary shaft 6. Inside the casing 4, the pressure of processing fluid is controlled. The shaft seal apparatus 2 of the present embodiment is provided so that the processing fluid inside of the casing 4 dose not leak along the rotary shaft 6 from a space between the end of the casing 4 and the rotary shaft 6. In FIG. 1, the shaft seal apparatus 2 mounted on one end of the casing 4 along the rotary shaft 6 is only shown. However, sometimes a similar shaft seal device 2 is mounted on the other end of the casing 4 along the rotary shaft 6.

The shaft seal apparatus 2 of the present embodiment comprises a mechanical seal device 35. The mechanical seal device 35 comprises at least a stationary ring 40 and a rotary ring 56. As shown below, the stationary ring 40 is attached to the casing 4, and the rotary ring 56 is attached to the rotary shaft 6.

At one end of the casing 4 along the rotary shaft 6, a cylindrical seal cover (stationary member) 8 is removably attached by a bolt 10 and the like. A seal member 12 such as gasket is attached between the seal cover 8 and the casing 4 in order to seal the space. Further, the bolt 10 shown in FIG. 1 is passed through a bolt hole 9 of the seal cover 8 shown in FIG. 2.

As shown in FIG. 1, a sealed space 33 is formed between a main inner circumferential surface 32 of the seal cover 8 and the rotary shaft 6. The sealed space 33 communicates with the inside of the casing 4, and the fluid which is the same with the processing fluid inside of the casing is sealed by the mechanical seal device 35 as sealed fluid.

At the outside axial end of the seal cover 8 along the rotary shaft 6, an inward convex portion 37 protruding toward a radially inner side is integrally formed. At the inner circumferential surface of the inward convex portion 37, a first mounting inner circumferential surface 34 and a second mounting inner circumferential surface 36 are formed in order from the axially inner side. The inner diameter of the first mounting inner circumferential surface 34 is smaller than that of the main inner circumferential surface 32, and the inner diameter of the second mounting inner circumferential surface 36 is smaller than that of the first mounting inner circumferential surface 36. Further, in FIG. 1, the outer side (in a direction of arrow A1/referred to as a forward) along the rotary shaft 6 is a direction departing from the casing 4. In this embodiment, it is the atmosphere side. Furthermore, the inner side in a direction opposite to the arrow A1 is a direction approaching to the casing 4. It is the sealed fluid side, and it can be referred to as a backward.

On the first mounting inner circumferential surface 34 and the second mounting inner circumferential surface 36 of the inward convex portion 37, the stationary ring 40 is removably attached. Between the stationary ring 40, and the first mounting inner circumferential surface 34 and the second mounting inner circumferential surface 36, the seal member 42 such as O-ring is interposed to seal the space.

Figure 5:
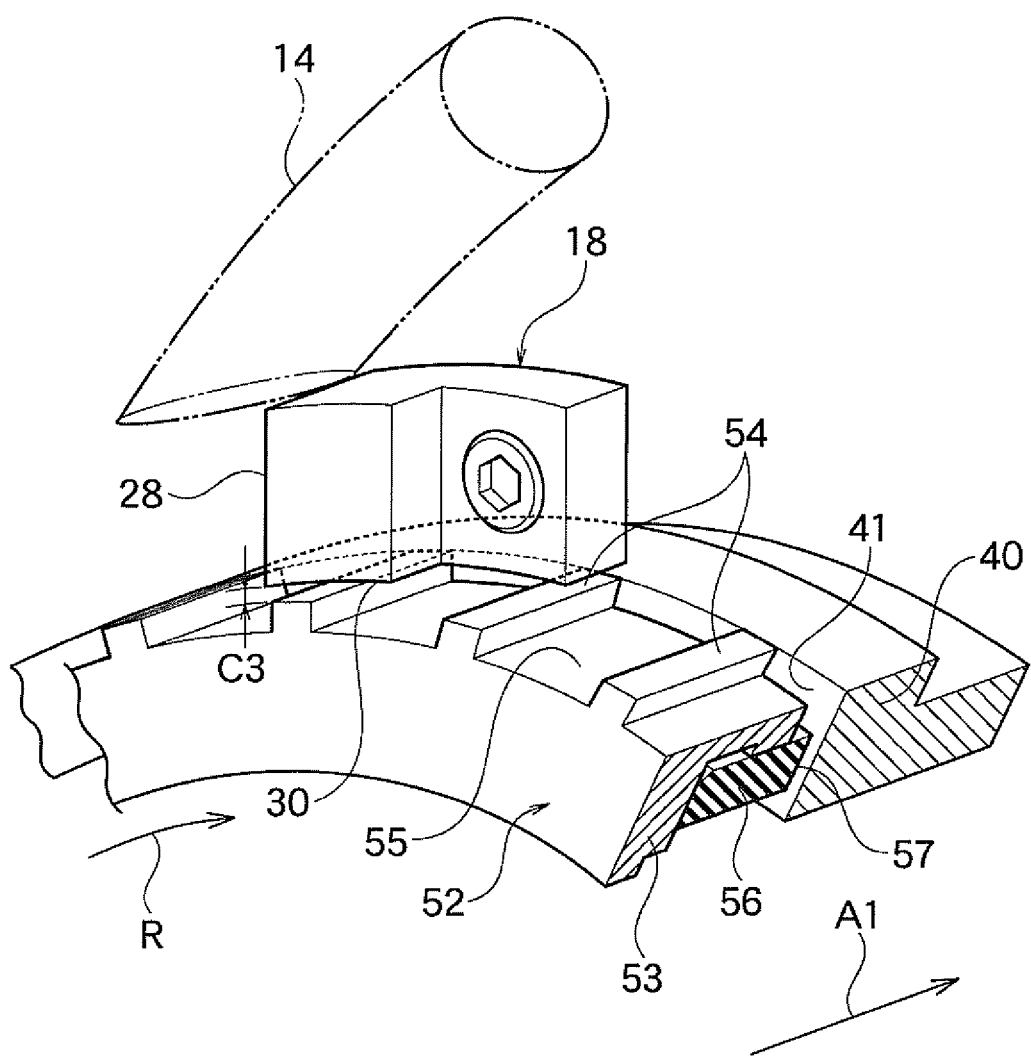
FIG. 5 is a cross sectional perspective view of main part including the retainer, the rotary ring and the baffle member shown in FIG. 1.

As shown in FIG. 5, in order to keep a rotational sliding surface 57 of the rotary ring 56 slideable with respect to a stationary sliding surface 41 of the stationary ring 40 and then to seal the fluid by these sliding surfaces, a rotational portion of the mechanical seal device 35 is assembled to the rotary shaft 6 as shown in FIG. 1. Specifically, the configuration is as follows.

A sleeve 45 is engaged with the rotary shaft 6, and a collar 43 is connected to the outside axial end of the sleeve 45 by a bolt 44 and is fixed on the rotary shaft 6 by a set screw 47. Therefore, the sleeve 45 and the collar 43 are capable of rotating together with the rotary shaft 6 in a direction of arrow R.

At the outer circumstance of the inside axial end of the sleeve 45, an inside end of the pumping ring 46 is fixed by a set screw 47. On the inside end of the pumping ring 46, a cylindrical portion extending to the outward direction A1 along the rotary shaft 6 is integrally formed. On the outer circumferential surface of the cylindrical portion, a spiral projection 48 is formed. By rotating the pumping ring 46 together with the rotary shaft 6 in a direction of arrow R, a flow in a direction of arrow A1 is produced in a space between the rotary shaft and the main inner circumferential surface 32 of the seal cover 8.

At a radial inside of the cylindrical portion of the pumping ring 46 provided with the spiral projection 48, an adapter 49 is fixed by the bolt and the like with respect to the inside end of the pumping ring 46. Among the adapter 49, the pumping ring 46, and the sleeve 45, the seal member such as O-ring is interposed to seal the space.

In an outward direction A1 of the adapter 49, a back end (inside end) of bellows 50 is connected to the adapter 49. At a front end (outward direction A1) of bellows 50, a retainer 52 is connected. The retainer 52 is pressed toward the stationary ring 40 by the axial spring force of bellows 50, and consequently, the rotary ring 56 is pressed to the sliding surface of the stationary ring 40. The inner circumference and the outer circumference of bellows 50 are blocked from the circulation of fluid by the bellows 50 itself. As shown FIG. 5, the retainer 52 comprises a disc-shaped portion 53 and a cylindrical portion 55 which are integrally formed.

On the radial inside of the cylindrical portion 55 of retainer 52, the rotary ring 56 is removably retained so that it can be exchanged when maintenance is being performed. The rotational sliding surface 57 formed on the tip end (in a direction of arrow A1) of the rotary ring 56 is capable of sliding by rotating in a direction of arrow R with respect to the stationary sliding surface 41 formed on the back end (in a direction opposite to arrow A1) of said stationary ring 40. The rotational sliding surface 57 of the rotary ring 56 protrudes toward the tip side further than the tip end of the retainer 52.

The materials for the rotary ring 56 and the stationary ring 40 are not particularly limited, and they are composed of carbon, silicon carbide, hard metal, alumina ceramic, engineering plastic or composite materials of said materials. For the other members composing the mechanical seal device 35 shown in FIG. 1, metal or other materials except for the seal member which is composed of synthetic resin or rubber and the like are exemplified. A gasket as a seal member is sometimes composed of metal thin plate and graphite, in addition to synthetic resin and rubber.

Figure 4:
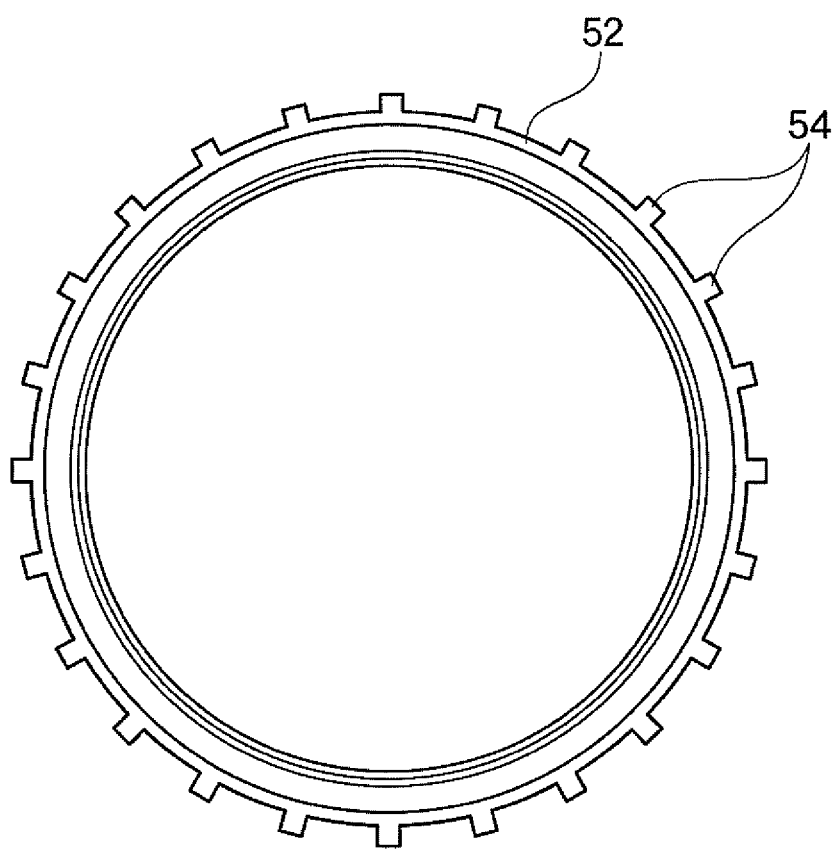
FIG. 4 is a front view of a retainer shown in FIG. 1.

As shown in FIG. 4, on the outer circumferential surface of the cylindrical portion 55, convex portions 54 are formed along the axial direction at predetermined intervals along the circumferential direction. The shape and intervals of the convex portions 54 are not particularly limited. However, in the present invention, as shown in FIG. 4, the cross section of the convex portion 54 has a square shape, and the convex portions 54 are formed at 10 to 40 equal intervals along the circumferential direction. It is not particularly limited to the embodiment as shown, provided that the convex portions 54 are shaped and arranged so that they produce a circumferential flow of the sealed fluid resulting from the rotation of the rotary shaft 6 shown in FIG. 1. Further, although it is preferable that the convex portions are formed on the outer circumferential surface of the retainer 52, even if they are not formed, the flow of the sealed fluid in a rotating direction resulting from the rotation of the retainer 52 is formed to a certain extent.

Figure 2:
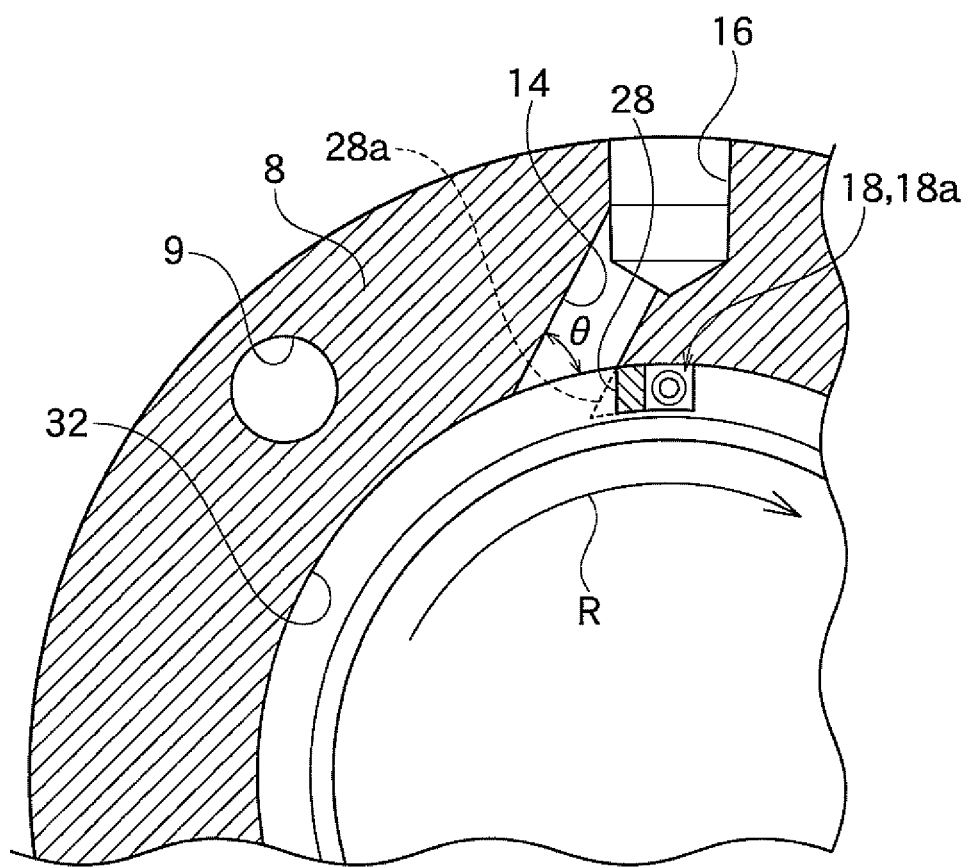
FIG. 2 is a cross sectional view of main part of a seal cover and a baffle member taken along the line II-II shown in FIG. 1.
Figure 3:
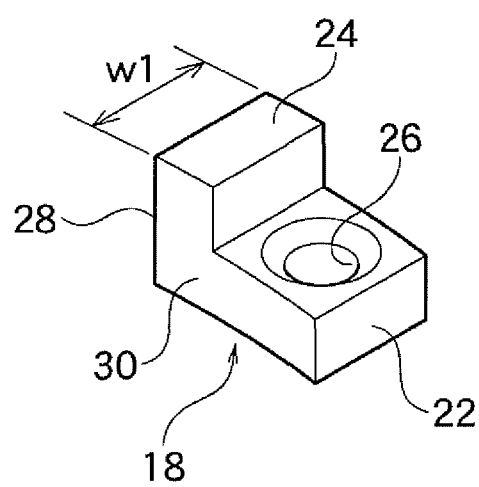
FIG. 3(A) is a perspective view of the baffle member shown in FIG. 1 and FIG. 2.
FIG. 3(B) is a perspective view showing an alternative embodiment of the baffle member shown in FIG. 3(A).
Figure 3:
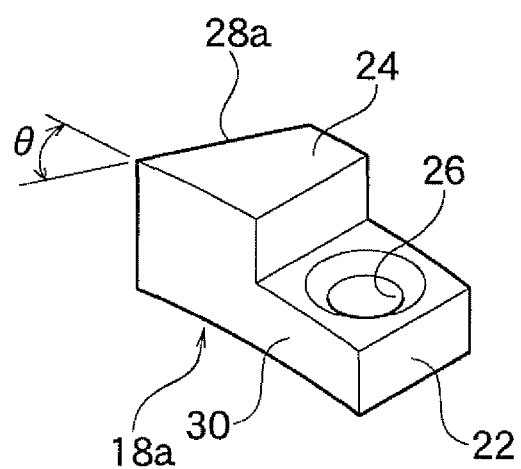

As shown in FIG. 1 and FIG. 2, on the main inner circumferential surface 32 of the seal cover 8, the discharge hole 14 is formed near a stepped portion with the first mounting inner circumferential surface 34 to connect to the sealed space 33. In the present embodiment, the discharge hole 14 is formed in one place in a circumferential direction, at the outer circumference position of the rotary ring 56 positioned on the downstream side of the axial direction of the sealed fluid resulting from the rotation of the pumping ring 46.

Further, as shown in FIG. 2, the discharge hole 14 is inclined (non-right angel) with respect to the main inner circumferential surface 32 of the seal cover 8 in a direction accepting the flow of the sealed fluid along the rotating direction R of the rotary shaft. An inclination angle θ of discharge hole 14 with respect to the main inner circumferential surface 32 is preferably 0 to 60 degree. In the present embodiment, as shown in FIG. 1, the discharge hole 14 is not inclined but perpendicular to an axial center of the rotary shaft 6. However, for the shaft seal apparatus 2a of the embodiment shown in FIG. 7, the discharge hole 14a is inclined to the axial center of the rotary shaft 6, and it may be configured so that the sealed fluid flowing along the axial direction of the rotary shaft 6 is accepted.

As shown in FIGS. 1 to 3 and 5, at the main inner circumferential surface 32 of the seal cover 8, near the discharge hole 14, and on the downstream position of the rotating direction R of the discharge hole 14, the baffle member 18 is removably mounted by the bolt 20 and the like with respect to the seal cover 8. As shown in FIG. 3(A), the baffle member 18 comprises a base plate portion 22 and a flow guiding portion 24 protruding in a direction nearly perpendicular to the base plate portion 22. On the base plate portion 22, a mounting hole 26 is formed. By passing a bolt and the like through the mounting hole 26, it enables to removably mount the baffle member 18 with respect to the seal cover 8.

A side 28 of the flow guiding portion 24 of the baffle member 18 is a guiding surface to block the flow of the sealed fluid flowing along the rotating direction R shown in FIG. 2 and to guide it in a direction to the discharge hole 14. Further, a L-shaped side 30 of the baffle member 18 is a surface facing the convex portions 54 formed on the outer circumferential surface of the retainer 52 as shown in FIG. 5. Although it is preferable that the side 30 has an arc curved surface according to the shape of the convex portions 54, it may be a planar shape.

The length of the space C3 between the L-shaped side 30 of the baffle member 18 and the convex portions 54 is equal to the value that the width W1 of the baffle member 18 shown in FIG. 3(A) is subtracted from the length of the space C2 between the convex portions 54 and the main inner circumferential surface 32 of the seal cover 8 shown in FIG. 1. For the space C3 shown in this FIG. 5, it is preferably in the range of 0.5 to 3.0 mm. Further, as shown in FIG. 1, the space C1 between the spiral projection 48 of the pumping ring 46 and the inner circumferential surface 32 is narrowly configured with respect to the space C2 between the outer circumference of the convex portion 54 and the inner circumferential surface of the seal cover 8, and it is preferably in the range of 0.5 to 1.5 mm.

Further, in the present embodiment, as shown in FIG. 3(A), the side 28 and the side 30 are nearly perpendicularly configured. However, as shown FIG. 2 and FIG. 3(B), they may be inclined at a sharp angle according to the inclination angle θ of the discharge hole 14. In that case, the sealed fluid flowing along the rotating direction R contacts with the side 28a. With that, it enables to orient the sealed fluid toward the discharge hole 14 more easily.

The discharge hole 14 communicates with a discharge connection opening 16 which is formed outside of the seal cover 8. At the discharge connection opening 16, the one connection end of external piping 19 shown FIG. 1 is connected. The other connection end of the external piping 19 is connected to an inflow connection opening 17 of the seal cover 8. On the external piping 19, pressure meters P1 and P2, a flow meter Q, a valve V and the like may be attached. Alternatively, it may be configured that a heat exchanger (not shown) is connected to the external piping 19 to cool the fluid flowing in the external piping.

The inflow connection opening 17 communicates with the inflow hole 15 which opens on the inner circumference surface of the seal cover 8. The inflow hole 15 is formed on the inner side (backside) along the rotary shaft 6 with respect to the discharge hole 14, and is positioned on the upstream side of the spiral projection 48 formed on the outer circumferential surface of the pumping ring 46. The inflow hole 15 may be formed perpendicular to the axial center of the rotary shaft 6. However, if there are spaces, as shown in FIG. 1, it is preferable that the inflow hole 15 is slightly inclined to the spiral projection 48 of the pumping ring 46 so that the fluid can flow toward the spiral projection more smoothly.

When the rotary shaft 6 is rotated in a direction of arrow R, the pumping ring 46 is also rotated at the same time. As a result, the spiral projection 48 moves the sealed fluid in the sealed space 33 in a direction of arrow A in the space C1. With the flow of the fluid, the fluid is drawn from the inflow hole 15. The sealed fluid flowing in a direction of arrow A1 through the space C1 reaches the outer periphery of the retainer 52, the rotary ring 56, and the stationary ring 40 to cool a heat generation by sliding of the rotary ring 56 and the stationary ring 40.

Afterwards or at the same time, the sealed fluid is rotated in a rotating direction R by the convex portions 54 formed on the outer circumferential surface 55 of the retainer 52 shown in FIG. 5 and it collides with the sides 28 or 28a of the baffle members 18 or 18a. And then, it is forcibly directed to the discharge hole 14. The fluid flowing in the discharge hole 14 is returned to the sealed space 33 from the inflow hole 15 and the connection opening 17 through the connection opening 16 and the external piping 19 shown in FIG. 1.

In the shaft seal apparatus 2 of the present embodiment, a centrifugal force, specifically, a force directed in a radially outer direction, is exerted, by the circumferential flow generated resulting from the rotation of the retainer 52, on the fluid in the downstream side of the pumping ring 46, so that the sealed fluid is discharged from the discharge hole 14. Further, by providing the baffle member 18 so as to orient the circumferential flow of the fluid toward the discharge hole 14, it enables to increase the flow rate of the fluid discharged from the discharge hole 14, and also enables to improve the discharge pressure from the discharge hole 14.

Figure 6:
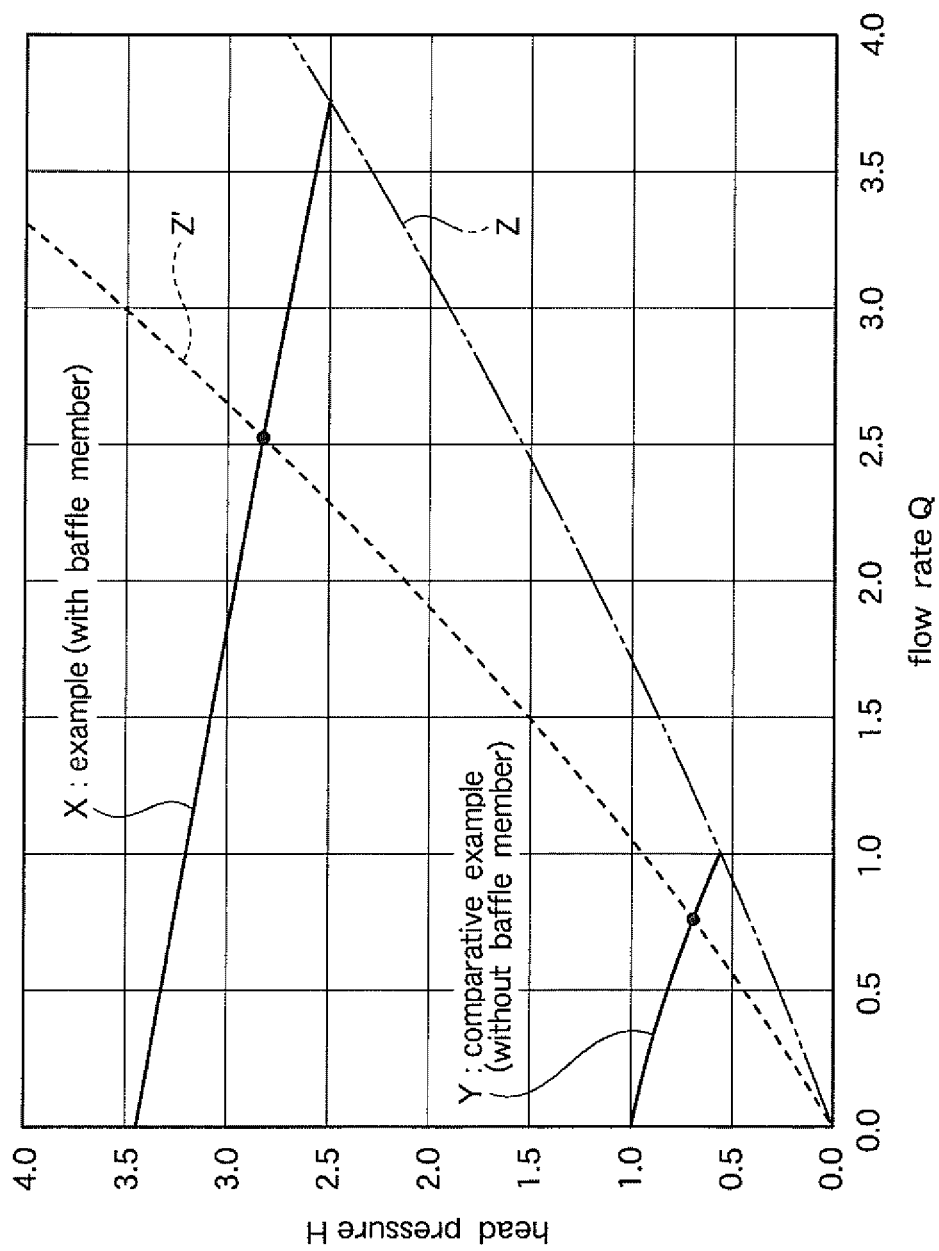
FIG. 6 is a graph showing the effects of the shaft seal according to the embodiment shown in FIGS. 1 to 5.

For instance, when the baffle member 18 is not mounted (comparative example), as a curved line Y of FIG. 6 shows, the flow rate Q (horizontal axis of FIG. 6) of the fluid flowing in the external piping 19 shown in FIG. 1 is low, and further, head pressure H (vertical axis) is also low. With respect to this, in example of the preset invention having the baffle member 18, as a curved line X of FIG. 6 shows, the maximum value of the head pressure H is improved about 3.5 times and the maximum value of the flow rate is improved about 3.7 times, compared with the comparative example (without baffle member).

Further, the flow rate Q can be measured by a flowmeter Q shown in FIG. 1. Furthermore, the head pressure H can be obtained from the pressure difference between the pressure meters P1 and P2 shown in FIG. 1, and the discharge pressure gets higher as the head pressure H is increased. The state that the valve V of the external piping 19 shown in FIG. 1 is completely closed is expressed as follows; the flow rate Q=0. Further, the curbed lines X and Y shown in FIG. 6 is made, by putting the valve V gradually in an open state to change the flow rate Q and measuring the head pressure H (the difference between the pressure P1 and P2) at each time to plot the value.

The curved line Z in FIG. 6 is based on a flow resistance of the external piping 19 shown in FIG. 1, and the maximum value of the flow rate and the head pressure according to example and comparative example are determined by the intersection of the curved lines X and Y with the curved line Z. When a heat exchanger and the like are interposed in the middle of the external piping 19, the flow resistance is increased, the inclination of the curved line Z gets higher as the curved line Z', and the maximum value of the flow rate according to example and comparative example is decreased. In comparative example Y, the more the flow resistance is increased (from the curved line Z to Z'), the more it becomes difficult to ensure the flow rate (for cooling). In line with that, the cooling tends to be insufficient on the sliding surface of the rotary ring. With respect to this, in the present example X, even if the flow resistance gets increased, it enables a sufficient cooling on the sliding surface of the rotary ring since the sufficient flow rate Q and the head pressure H can be ensured.

Further, in the present embodiment, there are no needs to provide a pumping function in the middle of the external piping 19 shown in FIG. 1. The longer the external piping 19 gets, the more the pressure loss is increased. Therefore, high discharge pressure is required to flow the fluid. However, in the present embodiment, it enables to improve the discharge pressure and to provide a longer piping than the conventional one if the flow rate is the same with the conventional. With this, it enables flexibility for the attachment and arrangement of the apparatus. Specifically, flexibility and diversity are improved.

Furthermore, it enables to provide a cooler having a higher cooling capacity (For a cooler having a high cooling capacity, a flow surface area of piping is large. The larger the flow surface area of the piping, the more the pressure losses.) in the middle of the external piping 19, and the cooling performance is improved.

Moreover, in the embodiment, by providing the baffle member 18 at the outer circumference of the rotary ring 56 or the retainer 52 with a radial space C3, even if a whirling of the rotary shaft 6 is caused, the baffle member 18 does not contact with the retainer 52 or the rotary ring 56 since there is a space C3. Therefore, it enables to largely design a geometrical tolerance of the rotational body (axial deflection, concentricity, perpendicularity). Further, even when the precision of the rotary shaft 6 is largely decreased at the time of operation (for instance, effects of bearing deterioration, damages and the like), it enables to avoid contacts of the baffle member 18 with the retainer 52 or the rotary ring 56. In addition, with the radial space C3, the fluid contacts the entire circumference of the retainer 52 and the rotary ring 56. Therefore, it enables to cool the fluid with the entire circumference.

Further, the convex portions 54 are provided on the outer circumferential surface 55 of the retainer 52 to make the surface area of the retainer 52 large and also to increase the area where the fluid contacts. With this, it enables easily to cool. Furthermore, the rotary ring 56 and the retainer 52 are rotating members. Therefore, by agitating the fluid with the convex portions 54 or grooves, it enables to cause increased circumferential flow and also enables to increase the discharge amount of the fluid from the discharge hole 14.

Moreover, in the present embodiment, as shown in FIG. 2, by inclining the discharge hole 14 to the inner circumferential surface 32 of the seal cover 8 at a predetermined angle θ, the circumferential flow which collides with the baffle member 18 is easily discharged, and the flow rate of the fluid discharged from the discharge hole 14 is increased and the discharge pressure is also increased. Further, the fluid flows in a circumferential direction, moving toward the radially outer side due to a circumferential flow and a centrifugal force caused by the circumferential flow. Therefore, when the discharge hole is inclined to the circumferential direction, the fluid flows toward the discharge hole 14, and the fluid is easily discharged.

Figure 7:
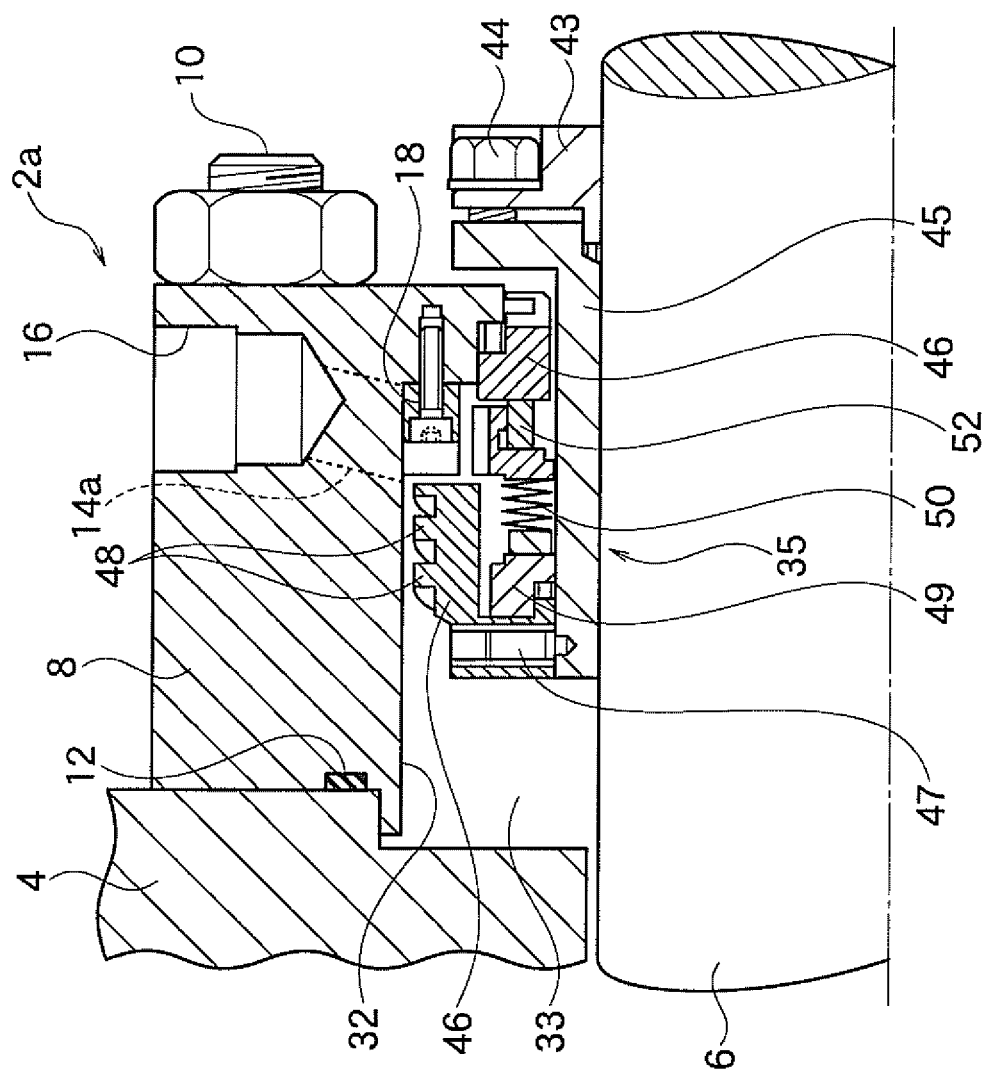
FIG. 7 is a cross sectional view of main part of the shaft seal apparatus according to other embodiment of the present invention.

Furthermore, in the present embodiment, as shown in FIG. 3(B), when the side 28a of the baffle member 18a at the discharge hole side is inclined to the discharge hole 14, the discharge flow rate is increased since the fluid flowing in a circumferential direction is easily to flow to the discharge hole, and also the discharge pressure is increased. Specifically, the flow rate is increased by avoiding the decrease of the discharge pressure. In addition, in the present embodiment, as shown in FIG. 7, the discharge hole 14a may be inclined to the axial direction. In that case, discharge hole 14a is provided to be directed to the axial flow of the fluid. Therefore, the fluid is discharged more easily.

Further, in this embodiment, the baffle members 18 or 18a are removably attached to the seal cover 8. Therefore, it enables to appropriately select the baffle members 18 or 18a according to the use conditions. Further, it enables to exchange only the baffle members 18 or 18a when maintenance is being performed.

Furthermore, the baffle members 18 or 18a are removable and it enables to process only with the baffle members 18 or 18a. Further, it becomes possible to process more complicated shapes of the baffle members. In addition, the baffle members 18 or 18a can be made of different materials from the seal cover 8 and also more flexible materials than the rotary ring, for instance, flexible materials such as plastics. In this case, even if the whirling of the rotary shaft 6 is excessive, and the baffle members 18 or 18a contact with the retainer 52 or the rotary ring 56, it enables to prevent the damage of the retainer 52 or the rotary ring 56, and also enables to avoid the loss of important function as a mechanical seal, specifically, enables to avoid the leakage of the fluid and the like.

Second Embodiment

Figure 8:
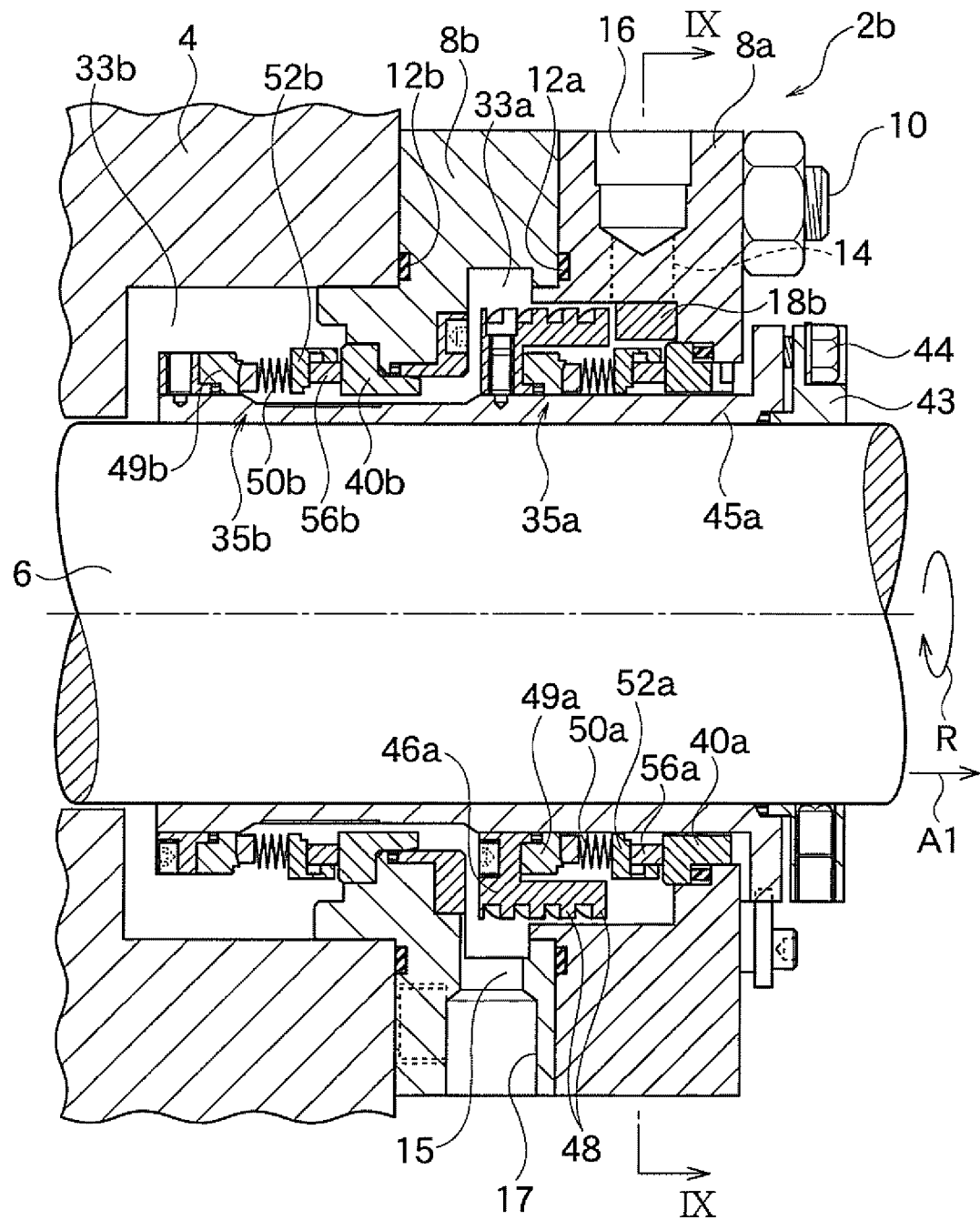
FIG. 8 is a cross sectional view of main part of the shaft seal apparatus according to still other embodiment of the present invention.
Figure 9:
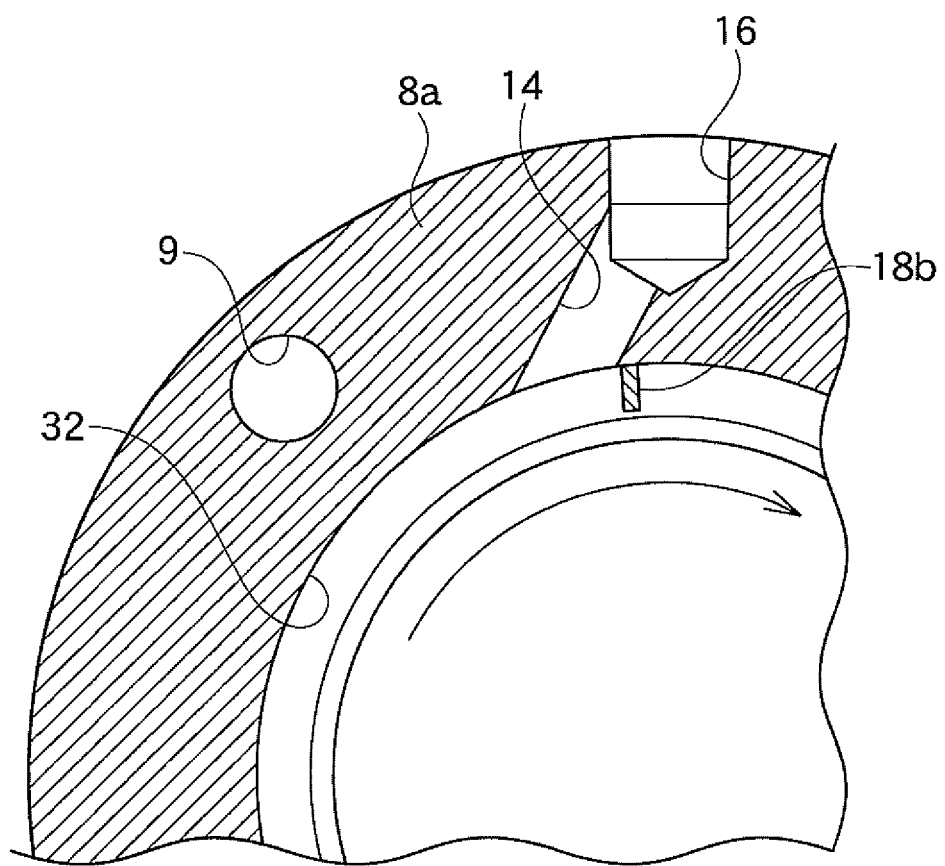
FIG. 9 is a cross sectional view of main part of the seal cover and the baffle member taken along the line IX-IX shown in FIG. 8.

The shaft seal apparatus 2b according to the other embodiment of the present invention shown in FIG. 8 is a tandem mechanical seal, which is different form the single mechanical seal device shown in FIGS. 1 and 7, and is provided with both first and second mechanical seal devices 35a and 35b along the axial direction. The followings are the detailed explanation of the parts which are different from the embodiment shown in FIGS. 1 to 7, and the explanation of the common parts is partially omitted.

As shown in FIG. 8, in the present embodiment, on the outside end of the casing 4 (in a direction of arrow A1), a first seal cover 8a is removably secured through a second seal cover 8b by a bolt 10. The first seal member 12a such as gasket is interposed between the first seal cover 8a and the second seal cover 8b, and the second seal member 12b is interposed between the second seal cover 8b and the casing 4 to seal these spaces.

On the inner circumferential side of the first seal cover 8a, the mechanical seal device 35a which is similar to the mechanical seal device 35 of the first embodiment is mounted. The stationary ring 40, the rotary ring 56, the retainer 52, the bellows 50, the adapter 49 and the pumping ring 46 of the mechanical seal device 35 of the first embodiment are the same with the stationary ring 40a, the rotary ring 56a, the retainer 52a, the bellows 50a, the adapter 49a and the pumping ring 46a of the present embodiment.

Figure 10:
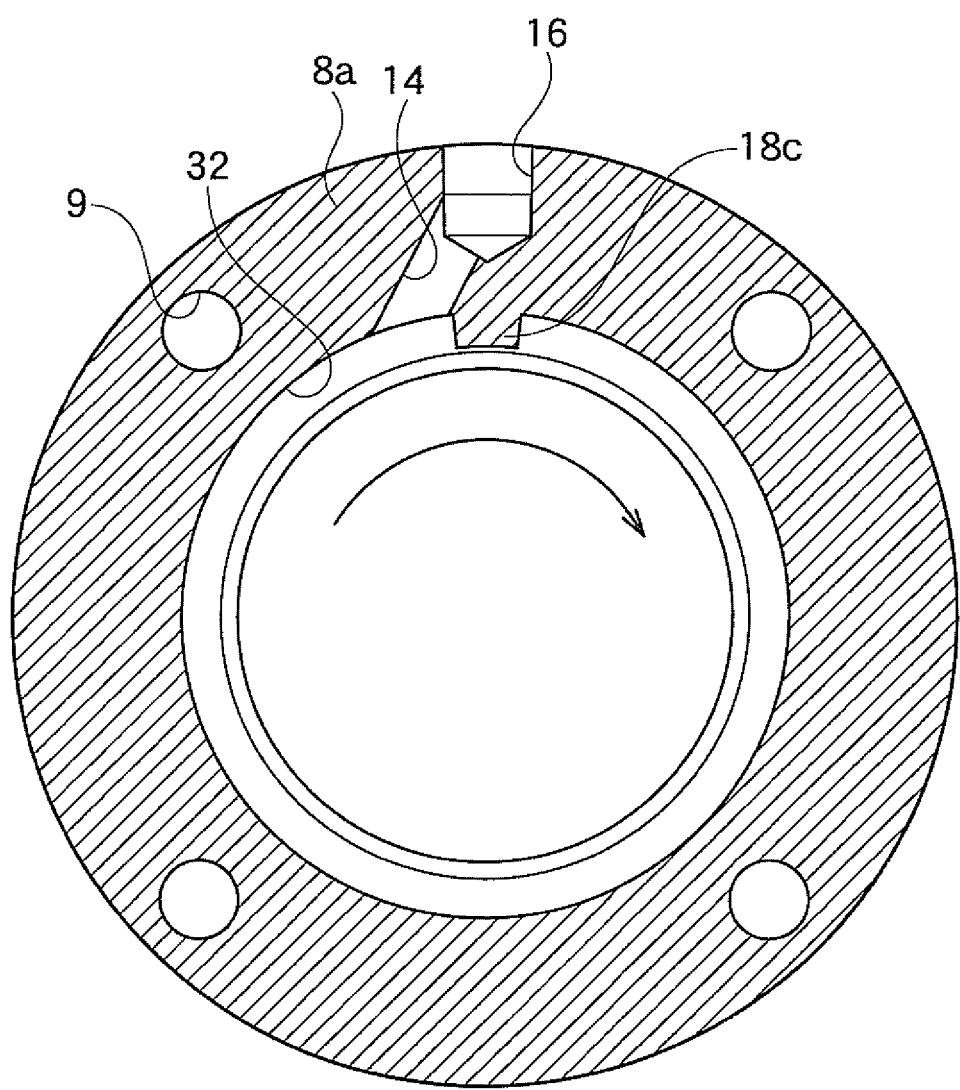
FIG. 10 is a cross sectional view of main part showing an alternative embodiment of the seal cover and the baffle member shown in FIG. 9.

However, in this embodiment, a plate-like baffle member 18b is formed and fixed by welding and the like on the inner circumferential surface of the first seal cover 8a, instead of the baffle members 18, 18a of the first embodiment, in a positional relation similar to the baffle members 18, 18a with respect to the discharge hole 14 and the retainer 52. Alternatively, as shown in FIG. 10, a convex baffle member 18c may be integrally formed with the first seal cover 8a in a positional relation similar to the baffle member 18b.

In the present embodiment, as shown in FIG. 8, a sleeve 45a which is attached on the outer circumference of the rotary shaft 6 is formed longer in the axial direction than the sleeve 45 of the first embodiment so that the back end of the sleeve 45a enters into the sealed space 33b formed in the end of the casing 4.

The sealed space 33b communicates with the inside of the casing 4 so that the processing fluid inside of the casing enters into the sealed space 33b as a sealed fluid. Further, an intermediate sealed space 33a is formed at the inner circumferential side of the first seal cover 8a and the second seal cover 8b, and the intermediate sealed space 33a and the sealed space 33b are sealed by the second mechanical seal device 35b.

The stationary ring 40b of the second mechanical seal device 35b is removably secured to a radial inner end of the second seal cover 8b, and has a similar configuration with the stationary ring 40a of the first mechanical seal device 35a. For the rotary ring 56b sliding with the stationary ring 40b, it has a similar configuration with the rotary ring 56a of the first mechanical seal device 35a. For the retainer 52b retaining the rotary ring 56b, it has a similar configuration with the retainer 52a of the first mechanical seal device 35a. However, it is not necessarily to provide the convex portions 54 shown in FIG. 5 at its outer circumferential surface.

The bellows 50b and the adapter 49b of the second mechanical seal device 35b are the same with corresponding parts in the first mechanical seal device 35a. For the second mechanical seal device 35b, there is no need to provide the pumping ring 46a of the first mechanical seal device 35a. The sealed space 33b and the intermediate sealed space 33a are sealed by the second mechanical seal device 35b, and the intermediate sealed space 33a and the outside of casing 4 (atmosphere) are sealed by the first mechanical seal device 35a.

As with the first embodiment, the sealed fluid of the intermediate sealed space 33a is moved in a direction of arrow A1 by the rotation of the pumping ring 46a. With the above flow of the fluid, the fluid is drawn from the inflow hole 15 which is formed on the second seal cover 8b. The sealed fluid flowing in a direction of arrow A1 reaches the outer periphery of the retainer 52a, the rotary ring 56a, and the stationary ring 40a to cool a heat generation by sliding of the rotary ring 56a and the stationary ring 40a.

Afterwards or at the same time, the sealed fluid is rotated in a rotating direction R by the outer circumference of the retainer 52a and it collies with the plate-like baffle member 18b or the convex baffle member 18c. And then, it is forcibly directed to the discharge hole 14. The fluid flowing in the discharge hole 14 is returned to the intermediate sealed space 33a from the inflow hole 15 and the connection opening 17 through the external piping 19 and the connection opening 16 shown in FIG. 1.

In the shaft seal device 2b of the present embodiment, it is possible to enclose the fluid for cooling only, which is different form the processing fluid inside of the casing 4, in the intermediate sealed space 33a, and enables to discharge the enclosed sealed fluid from the discharge hole 14 and return it from the inflow hole 15 to the intermediate sealed space 33a. Therefore, it enables to circulate the fluid for cooling without being influenced by pressure fluctuation and flow fluctuation of the processing fluid inside of the casing 4. For the other configuration and effects, they are the same with the aforementioned first embodiment.

Further, the present invention is not limited to the above-mentioned embodiments, and it can be modified variously within the range of the present invention.

For instance, the discharge hole 14 may be formed together with the baffle members 18, 18a, 18b or 18c on multiple places in a circumferential direction. For the inflow hole 15, the same thing can be said.

Further, in the above-mentioned embodiment, a positional relation between the inflow 15 and the discharge hole 14 may be reversed. However, the baffle members 18, 18a, 18b or 18c have to be constantly positioned near the discharge hole 14. In this case, it is necessary to make the axial flow of the sealed fluid by the pumping rings 46, 46a flow in a direction opposite to the axial outside direction A1. In this embodiment, it enables effectively to cool the rotary ring and the stationary ring by the cooled sealed fluid flowing form the inflow hole.

Figure 11:
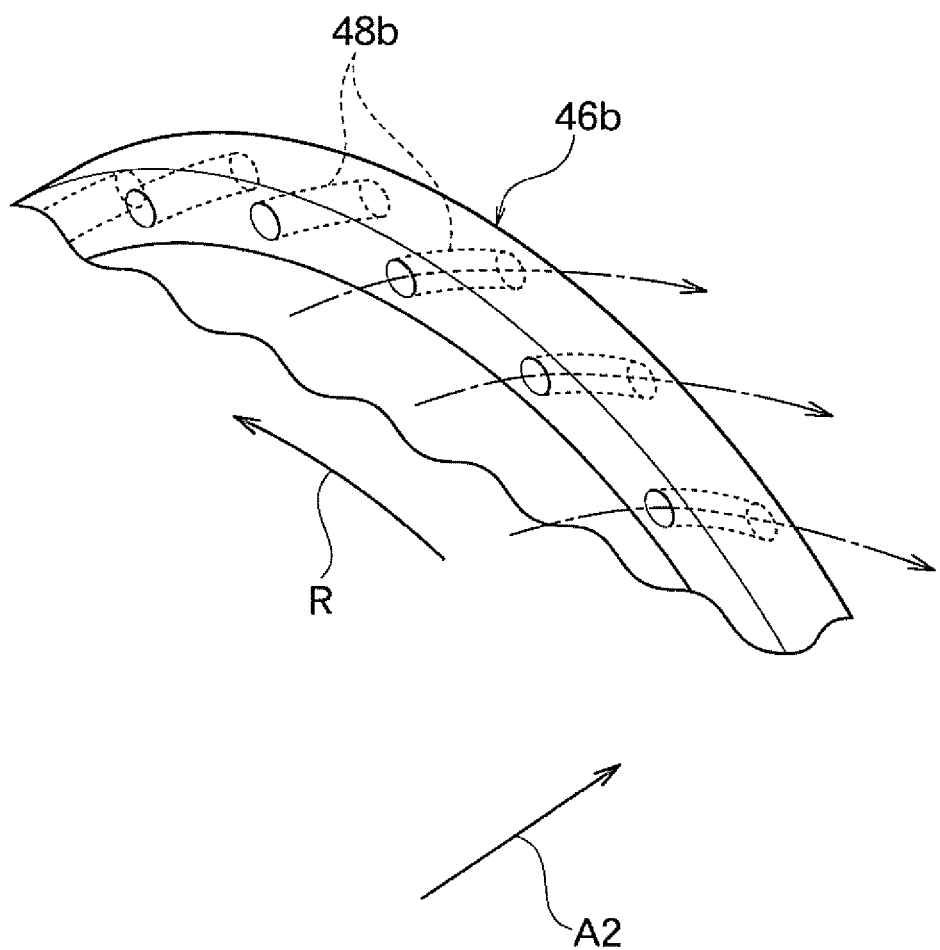
FIG. 11 is a perspective view of main part showing an alternative embodiment of the pumping ring shown in FIG. 1.

Furthermore, instead of the pumping ring 46 used in the above-mentioned embodiment, other pumping ring may be used. For the pumping ring, it can be anything, provided that it has a shape and/or a configuration producing the axial flow of the rotary shaft 6. For instance, for the pumping ring 46b shown in FIG. 11, a through hole 48b inclining to an axial line A2 of the rotary shaft at a predetermined angle is formed on the flange portion of the ring in a circumferential direction at predetermined intervals. By providing this through hole 48b, it enables to produce the axial flow of the rotary shaft 6. This pumping ring 46b has advantages in case of making the outer diameter of the pumping ring small and also making the axial length small.

EXPLANATION OF REFERENCE NUMERALS 2, 2a, 2b—shaft seal apparatus
4—casing
6—rotary shaft
8—seal cover
   8a—first seal cover
   8b—second seal cover
14, 14a—discharge hole
15—inflow hole
18, 18a—baffle member
   18b—plate-like baffle member
   18c—convex baffle member
32—main inner circumferential surface
33, 33b—sealed space
   33a—intermediate sealed space
34—first mounting inner circumferential surface
36—second mounting inner circumferential surface
40, 40a—stationary ring
46, 46a, 46b—pumping ring
48—spiral projection
   48b—through hole
52, 52a—retainer
56, 56a—rotary ring

The invention claimed is:
1. A shaft seal apparatus comprising:
a stationary ring secured to a seal cover of a casing; and
a rotary ring secured to a rotational shaft that rotates with respect to said casing to rotate together with said rotational shaft, and having a rotational sliding surface that slides on a stationary sliding surface of said stationary ring, wherein
said seal cover covers over said rotational shaft so that a sealed space of sealed fluid sealed by sliding of said stationary sliding surface and said rotational sliding surface is formed over said rotary ring, and a rotational pumping ring having a spiral projection on its outer circumferential surface and producing an axial flow of said sealed fluid and placed in said sealed space is fixed for rotation with said rotational shaft at an axial position different from said rotary ring and different from an impeller in the casing so that said sealed fluid positioned in said sealed space flows along the axial direction of said rotational shaft when said rotational shaft is rotated, a discharge hole is formed on an inner circumferential surface of said seal cover positioned in a downstream side of the axial flow of said sealed fluid resulting from a rotation of said rotational pumping ring, a flow guide having a side that is provided on the inner circumferential surface of said seal cover so that it protrudes radially inward in order to block a rotational flow of said sealed fluid along the rotating direction of said rotational shaft changed from the axial flow and orient the sealed fluid toward said discharge hole; and said discharge hole is formed on the inner circumferential surface of said seal cover positioned over said rotary ring, and said discharge hole is inclined to the inner circumferential surface of said seal cover in a direction accepting the flow of said sealed fluid along the rotating direction of said rotational shaft.

2. The shaft seal apparatus as set forth in claim 1, wherein an inflow hole is formed on the inner circumferential surface of said seal cover positioned in an upstream side of the axial flow of said sealed fluid resulting from the rotation of said rotational pumping ring, so that the sealed fluid discharged from said discharge hole returns to the inside of said sealed space from said inflow hole.

3. The shaft seal apparatus as set forth in claim 1, wherein said flow guide portion is arranged with a predetermined space over said rotary ring or a retainer retaining said rotary ring, and a convex portion increasing the flow of said sealed fluid along the rotating direction of said rotational shaft is formed on the outer circumference of said rotary ring or retainer.

4. The shaft seal apparatus as set forth in claim 1, wherein said flow guide portion is removably mounted with respect to said seal cover.

5. The shaft seal apparatus as set forth in claim 1, wherein said flow guide portion includes a radially inward-facing L-shaped surface.

6. The shaft seal apparatus as set forth in claim 5, wherein said L-shaped surface is concave.

7. The shaft seal apparatus as set forth in claim 1, wherein said flow guide portion includes a side portion configured to block the flow of said sealed fluid along the rotating direction of said rotational shaft, said side portion inclined at a first angle relative to the inner circumferential surface of said seal cover.

8. The shaft seal apparatus as set forth in claim 7, wherein said discharge hole is inclined at a second angle relative to the inner circumferential surface of said seal cover, said second angle being substantially equal to said first angle.

9. The shaft seal apparatus as set forth in claim 1, further comprising a sleeve fixed for rotation with the rotational shaft, wherein the rotational pumping ring is coupled to the sleeve.

* * * * *